United States Patent
Chen et al.

(10) Patent No.: US 11,867,275 B2
(45) Date of Patent: Jan. 9, 2024

(54) BELT STARTER GENERATOR TUNING DEVICE

(71) Applicant: GATES CORPORATION, Denver, CO (US)

(72) Inventors: Xiaohua Joe Chen, Rochester Hills, MI (US); Anthony R. Mora, Rochester Hills, MI (US); Peter Ward, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 18/059,352

(22) Filed: Nov. 28, 2022

(65) Prior Publication Data
US 2023/0167893 A1 Jun. 1, 2023

Related U.S. Application Data

(60) Provisional application No. 63/284,436, filed on Nov. 30, 2021.

(51) Int. Cl.
| *F16H 55/36* | (2006.01) |
| *F16D 3/12* | (2006.01) |
| *F16D 41/20* | (2006.01) |

(52) U.S. Cl.
CPC ............ *F16H 55/36* (2013.01); *F16D 3/12* (2013.01); *F16D 41/206* (2013.01); *F16H 2055/366* (2013.01)

(58) Field of Classification Search
CPC .. F16H 55/36; F16H 2055/366; F16H 7/0827; F16D 3/12; F16D 41/206; F16D 2300/22; F16F 15/1216
USPC ...................................................... 474/94, 70
See application file for complete search history.

(56) References Cited

U.S. PATENT DOCUMENTS

| 7,712,592 | B2 * | 5/2010 | Jansen | F16D 3/72 474/902 |
| 7,878,315 | B2 * | 2/2011 | Saito | F16D 41/206 192/75 |
| 8,888,622 | B2 * | 11/2014 | Chen | F16D 3/72 474/94 |
| 9,033,832 | B1 * | 5/2015 | Serkh | F16D 41/206 474/70 |
| 9,759,266 | B1 * | 9/2017 | Serkh | F16D 7/022 |
| 9,850,997 | B2 * | 12/2017 | Cariccia | F16F 15/1216 |
| 11,028,884 | B2 * | 6/2021 | Serkh | F16H 55/36 |
| 11,326,648 | B2 * | 5/2022 | Faria | F16D 3/12 |
| 11,624,434 | B2 * | 4/2023 | Mora | F16F 15/123 474/94 |
| 11,629,762 | B2 * | 4/2023 | Antchak | F16H 7/20 474/94 |

(Continued)

OTHER PUBLICATIONS

European Patent Office; Notification of Transmittal of the International Search Report and the Written Opinion of the International Searching Authority, or the Declaration; International Application No. PCT/US2022/080518; dated Feb. 14, 2023.

*Primary Examiner* — Henry Y Liu
(74) *Attorney, Agent, or Firm* — Kevin J. Aiken, Esq.

(57) ABSTRACT

A belt tuning device to an accessory belt drive system (ABDS) that utilizes a torsional spring to connect the belt pulley to the shaft of a motor generator unit to isolate the system and allow the pulley to advance ahead of the motor or to be behind the motor. The tuning device also has a free running zone providing a decoupling function for the system, allowing the tuning device to be both a driver and a generator of power. The tuning device has all of the belt pulley, a spring retainer, a torsion spring, a stop ring, and a shaft fixed in relation to each other.

18 Claims, 5 Drawing Sheets

(56) References Cited

U.S. PATENT DOCUMENTS

| | | | |
|---|---|---|---|
| 2009/0176583 A1* | 7/2009 | Dell | F02N 11/04 |
| | | | 464/40 |
| 2009/0194380 A1* | 8/2009 | Ali | F16F 15/123 |
| | | | 188/381 |
| 2010/0178990 A1* | 7/2010 | Jansen | F16D 41/206 |
| | | | 464/39 |
| 2011/0065537 A1* | 3/2011 | Serkh | F16F 15/1216 |
| | | | 474/94 |
| 2012/0298474 A1* | 11/2012 | Ward | F16H 55/36 |
| | | | 192/41 S |
| 2013/0324335 A1* | 12/2013 | Chen | F16D 3/72 |
| | | | 474/94 |
| 2014/0141892 A1* | 5/2014 | Williams | F16D 13/76 |
| | | | 464/40 |
| 2014/0329631 A1* | 11/2014 | Mevissen | F16D 13/12 |
| | | | 474/166 |
| 2015/0184703 A1* | 7/2015 | Shimamura | F16F 15/1216 |
| | | | 192/41 S |
| 2015/0260265 A1* | 9/2015 | Agnitch | F16H 7/0827 |
| | | | 474/171 |
| 2015/0345575 A1* | 12/2015 | Antchak | F16H 55/36 |
| | | | 474/94 |
| 2016/0138700 A1* | 5/2016 | Hauck | F16H 55/36 |
| | | | 474/94 |
| 2016/0195182 A1* | 7/2016 | Cariccia | F16H 55/36 |
| | | | 474/94 |
| 2017/0298995 A1* | 10/2017 | Serkh | F16D 3/72 |
| 2017/0328443 A1* | 11/2017 | Serkh | F16D 13/76 |
| 2020/0025260 A1* | 1/2020 | Serkh | F16H 55/566 |
| 2020/0040947 A1* | 2/2020 | Ward | F16D 3/72 |
| 2020/0393033 A1* | 12/2020 | Mora | F16F 15/123 |
| 2020/0393034 A1* | 12/2020 | Mora | F16H 55/36 |

\* cited by examiner

BELT STARTER GENERATOR TUNING DEVICE

CROSS REFERENCE

This application claims priority to U.S. Provisional Patent Application Ser. No. 63/284,436, filed Nov. 30, 2021, and titled BELT STARTER GENERATOR TUNING DEVICE, the entire disclosure of which is incorporated herein by reference for all purposes.

BACKGROUND

Belt drive systems are widely used, such as in automobiles and industrial vehicles. However, torsional vibration induced by internal combustion engines, as well as high acceleration/deceleration rates and high rotor inertia, create noise and performance issues for the belt drive systems. Examples of such issues include belt chirp, excessive slip, and reduced belt life.

Crankshaft isolators/decouplers and alternator decouplers/isolators have been widely used for engines with high angular vibration to filter out vibration in engine operation speed ranges and to also control belt chirp.

An alternator isolator decoupler (AID) is a belt drive tuning device in the form of an alternator pulley used to isolate vibrations and make accessory belt drive systems (ABDS) run more smoothly. In newer automobiles, belt starter generator (BSG) systems use a motor generator unit (MGU) in place of an alternator. The MGU, like an alternator, produces electricity when it is driven by the belt. The MGU also can be a driver to facilitate boost and starting functions. The ability to be a driver means that traditional alternator-mounted isolator decouplers cannot be used, as the one-way clutch function of traditional isolator decouplers prohibits the driving function.

What is needed is a device that can provide similar vibration attenuation of a traditional isolator decoupler but with the ability to be a driver with vibration attenuation as well.

SUMMARY

The present disclosure provides a tuning device for a belt system that has a torsional spring connecting a pulley with the shaft (or rotor) to provide an isolation feature to an MGU or to an accessory belt drive system (ABDS), with a free running zone providing decoupling of the tuning device from the rotor. During the charging/boosting function, where the MGU is driven by the belt or drives the belt, the torsion spring inside the tuning device allows the pulley to angularly advance ahead of the rotor. This allows the tuning device to absorb the speed fluctuation induced by the engine's torsional vibration and to attenuate vibrations during both motoring and generation functions. Additionally, the decoupling of the rotor from the pulley structure further attenuates the vibrations.

In one particular implementation, this disclosure provides a belt tuning device for a belt drive, the tuning device comprising a pulley structure for receiving a belt on an external surface, a torsion spring positioned internal to the pulley structure, with a first end of the torsion spring fixed to a spring retainer fixed to the pulley structure and a second end of the torsion spring fixed to a spring stop ring, and a shaft extending internal to the torsion spring, the shaft having a flange with at least one recess having an arcuate length. The spring stop ring has at least one outwardly extending tab configured to fit within the at least one recess in the flange and the tab has an arcuate length less than the arcuate length of the recess. The pulley structure, the torsion spring and the shaft have a common rotational axis.

In another particular implementation, this disclosure provides a belt tuning device for a belt drive comprising a first end of a torsion spring fixed to a pulley structure for receiving a belt on an external surface and a second end of the torsion spring fixed to a spring stop ring. The spring stop ring has at least one outwardly extending tab configured to fit within a recess defined by a first edge and a second edge in a flange of a shaft, the tab configured to repeatedly slide in the recess from the first edge to the second edge and from the second edge to the first edge. The pulley structure, the torsion spring and the shaft have a common rotational axis.

In yet another particular implementation, this disclosure provides a belt tuning device comprising a pulley structure for receiving a belt on an external surface, the pulley structure fixed to a torsion spring at a first end of the torsion spring and with a second end of the torsion spring fixed to a spring stop ring. The tuning device also comprises a shaft having at least one recess having an arcuate length defined by a first edge and a second edge. The spring stop ring has at least one outwardly extending tab configured to fit within the at least one recess in the shaft, the tab having an arcuate length less than the arcuate length of the recess and configured to repeatedly slide in the recess in a first direction from the first edge to the second edge and in a second direction from the second edge to the first edge. The pulley structure, the torsion spring and the shaft have a common rotational axis Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
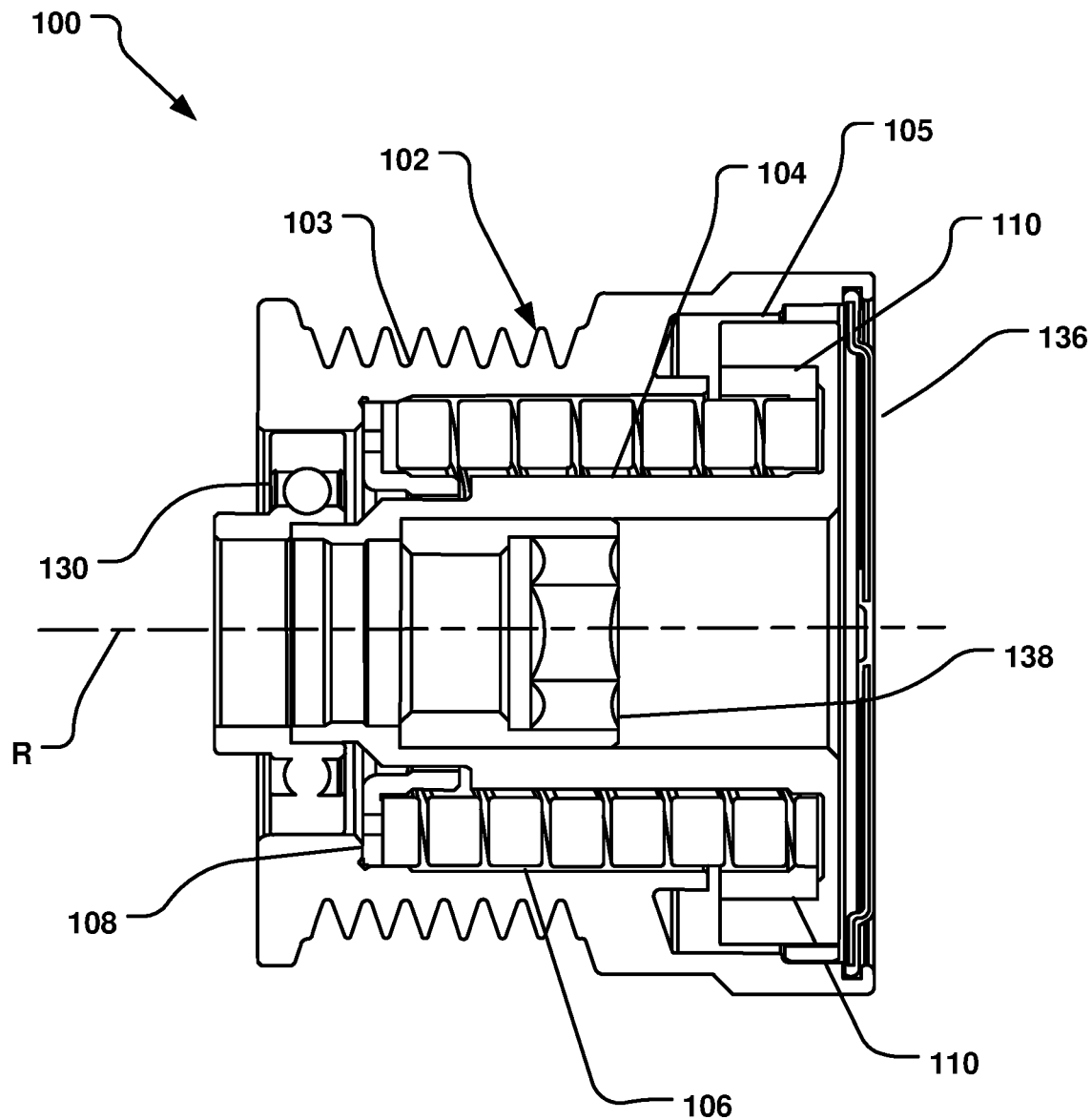
FIG. 1 is a cross-sectional side view of a tuning device.

As indicated above, the present disclosure is directed to tuning devices for belt systems, the tuning devices having a torsion spring connecting a pulley on which is a belt with the shaft (or rotor) of a motor generator unit (MGU). The tuning devices include a stop ring attached to the torsion spring that includes outwardly extending tabs that engage with the MGU shaft in a manner that allows either the shaft to drive the pulley or the pulley to drive the shaft.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Figure 2:
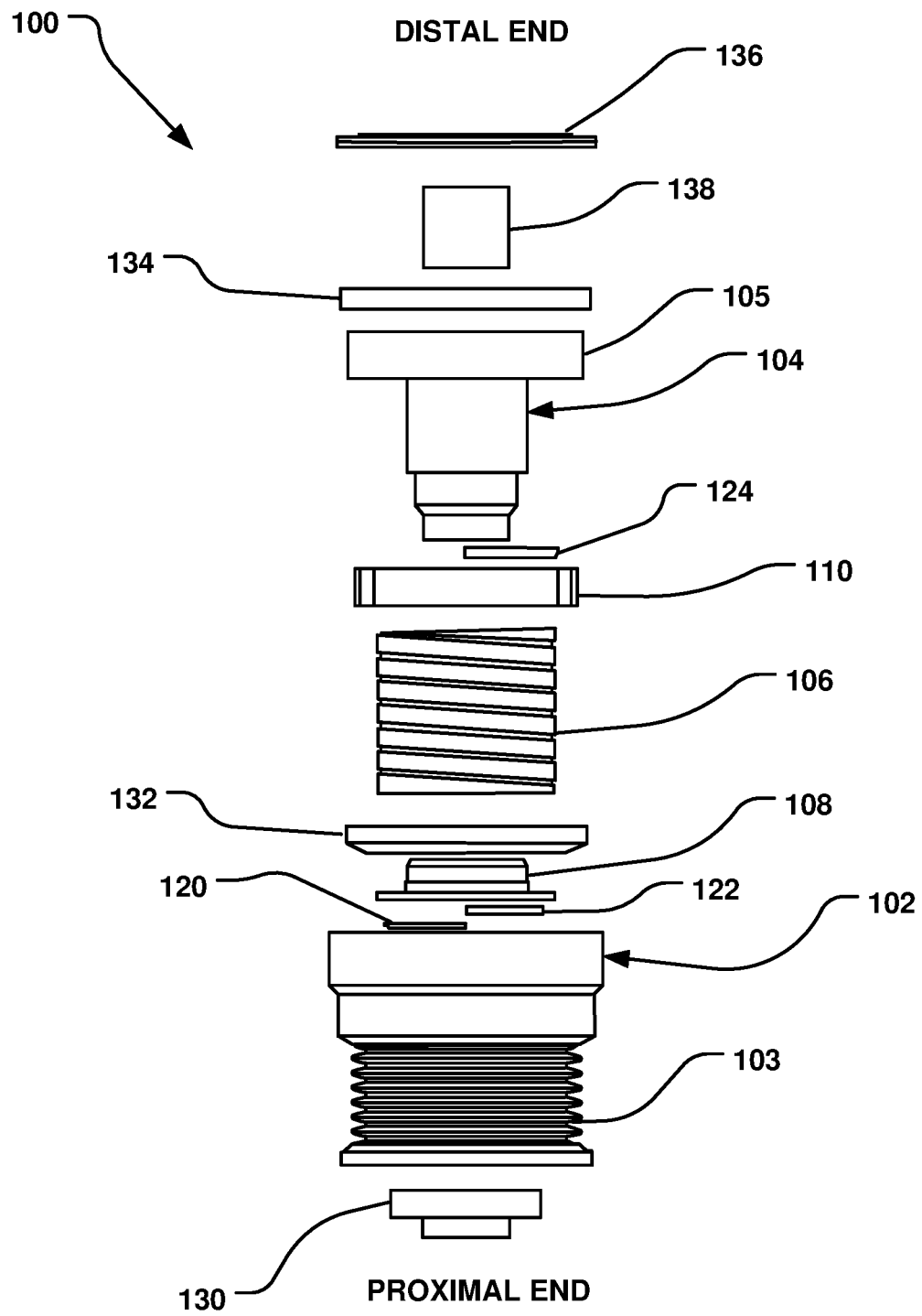
FIG. 2 is an exploded view of the tuning device of FIG. 1.

Turning to the figures, FIG. 1 shows a cross-sectional side view of a tuning device 100 and FIG. 2 shows the tuning device 100 in an exploded view.

The tuning device 100 includes a pulley structure 102 that is the overall housing or base of the tuning device 100 and that provides the interface to the belt (not shown); this particular pulley structure 102 includes a plurality of surface grooves 103 that engage with a plurality of ribs present on the belt. This tuning device 100 is configured, as described below, so that the pulley structure 102 and the belt (being turned by the engine) can drive the MGU to which the tuning device 100 is operably connected or so that the pulley structure 102 and the belt (turned by the MGU) can provide power to the engine.

A rotational shaft 104 extends through the pulley structure 102 and defines a rotational axis R of the pulley structure 102. The shaft 104 is fixed in relation to the shaft or rotor of the MGU unit, not seen in the figures, for example, by a nut 138 that engages with a bolt (not seen in the figures) connected to the MGU.

A torsional spring 106 is present around the shaft 104, the center axis of the spring 106 being the same as the rotational axis R of the pulley structure 102. At a proximal end of the tuning device 100, which is the end of the tuning device 100 connected to the MGU, a spring retainer 108 extends around the shaft 104 and holds the end of the spring 106 in fixed relation to the pulley structure 102; the spring retainer 108 is, e.g., welded, brazed, adhered, or otherwise fixed to the pulley structure 102 as well as to the torsion spring 106.

At a distal end of the tuning device 100, opposite from the MGU, the spring 106 is indirectly connected to a flange 105 of the shaft 104, through a spring stop ring 110, which is positioned around the shaft 104. The end of the spring 106 is, e.g., welded, brazed, adhered, or otherwise fixed to the stop ring 110, which seats in a pocket within the flange 105 together with the end of the spring 106. The stop ring 110 includes outwardly extending tabs, which are discussed further below.

Thus, at the proximal end, the spring 106 is fixed to the pulley structure 102 and, at the distal end, the spring 106 is fixed to the shaft 104. Such connections allow the transfer of power from the belt, through the pulley structure 102 to the spring 106 and then to the shaft 104 and the MGU rotor, and also in the reverse direction, from the MGU rotor to the shaft 104, through the spring 106 to the pulley structure 102 and the belt.

The exploded view of FIG. 2 illustrates numerous additional details of this implementation of the tuning device 100. It is noted that the exploded features shown in FIG. 2 may not be arranged in the order or positioned precisely as in the assembled tuning device 100.

As described above, the tuning device 100 has a pulley structure 102 with a plurality of grooves 103 on which a belt is received. The rotational shaft 104 extends through the pulley structure 102 and has therearound it the torsional spring 106. The spring retainer 108 holds the end of the spring 106 in fixed relation to the pulley structure 102, by a first weld 120 between the pulley structure 102 and the spring retainer 108 and a second weld 122 between the spring 106 and the spring retainer 108. The spring 106 is also connected to the spring stop ring 110, which is positioned around the shaft 104 within a pocket of the flange 105 of the shaft 104, by a third weld 124 between the spring 106 and the stop ring 110.

Also present in the tuning device 100 is a ball bearing 130 that engages with the MGU rotor and allows rotation of the tuning device 100 (particularly, the pulley structure 102) about its rotational axis R to allow the belt to turn the MGU rotor or the MGU rotor to turn the belt. An accumulation of grease 132 or other lubricant is present inside the pulley structure 102 to decrease friction. Towards the distal end is a bushing 134 that functions as a bearing, to allow relative rotation between the pulley structure 102 and the shaft 104, interfacing at the flange 105. A nut 138 is present to engage with a bolt or other structure to hold the tuning device 100 to the MGU. A seal 136, such as a dust cap, seals the internals of the tuning device 100 from external contaminants and retains the grease 132 inside the device 100.

The tuning device 100, particularly the shaft 104, may be journaled to the MGU rotor rather than being affixed to the rotor by a bolt passing through the tuning device 100 from the proximal end and engaged by the nut 138.

Figure 3A:
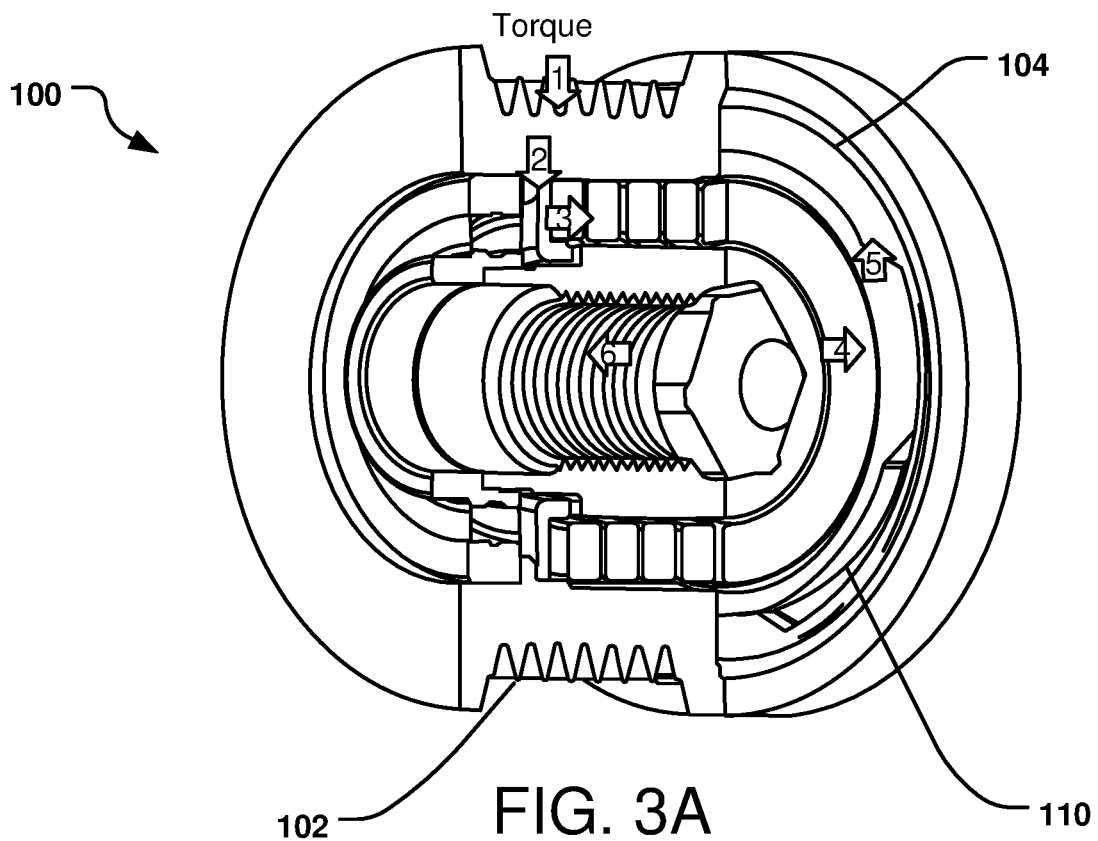
FIG. 3A is a cut-away view of the tuning device of FIG. 1 illustrating the path of power flow through the tuning device during power generation.
Figure 3B:
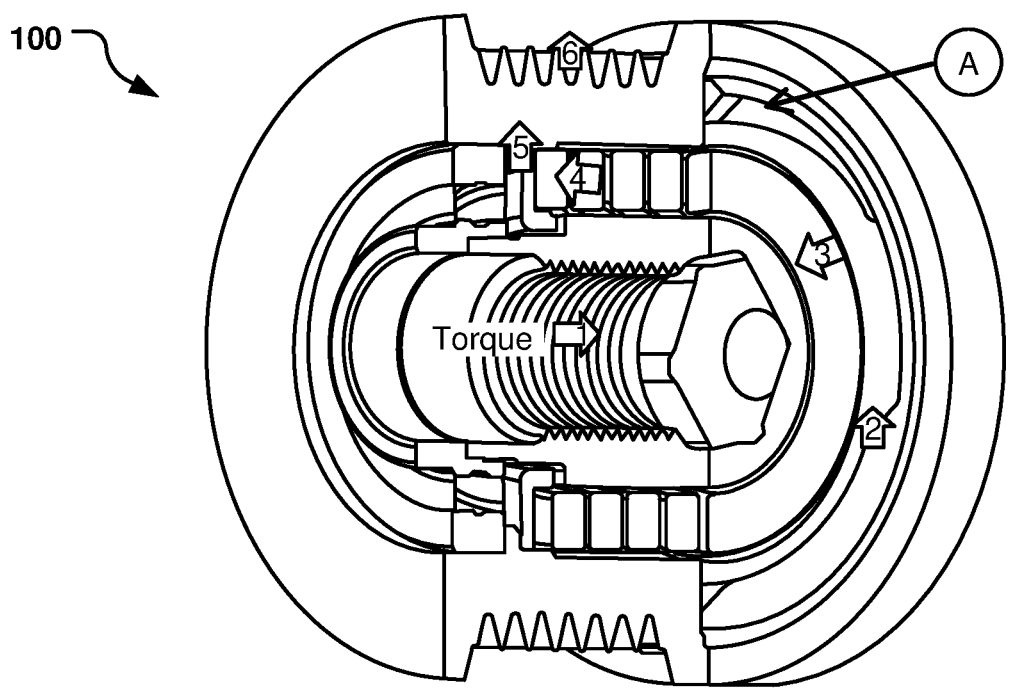
FIG. 3B is a cut-away view of the tuning device of FIG. 1 illustrating the path of power flow through the tuning device during motoring (as a driver).

The tuning device 100 has limited movement (rotation about the rotational axis R) of the spring stop ring 110 in relation to the shaft 104, both clockwise and counterclockwise, the movement limited by the structure of the device 100; it is this feature that allows the tuning device to be used for driving, being driven, and provides the decoupling feature. FIGS. 3A and 3B illustrate the two paths of power flow through the tuning device 100, as a driver of the MGU by the engine and as a driver of the engine by the MGU.

In FIG. 3A, power (transmitted via torque) passes from the engine via the belt to the pulley structure 102, which is fixed to the spring 106, through the spring 106 to the spring stop ring 110 and to the shaft 104.

The flange 105 of the shaft 104 includes recessed regions 140 in the pocket, defined by a first edge 142 and an opposite second edge 144. The length of the recessed region 140 is measured from the first edge 142 to the second edge 144 and may be, e.g., an arc of a defined number of degrees (e.g., about 90-100 degrees); by being defined by degrees, this arcuate length of the recessed region 140 is based on the size (e.g., radius, diameter, circumference) of the flange 105. In the particular implementation shown, the flange 105 has two directly opposite recessed regions 140, centered 180 degrees apart.

The stop ring 110 includes tabs 150, defined by a first edge 152 and an opposite second edge 154. The length of the tabs 150 is measured from the first edge 152 to the second edge 154 and may be, e.g., an arc of a defined number of degrees (e.g., about 45 degrees); by being defined by degrees, this arcuate length of the tabs 150 is based on the size (e.g., radius, diameter, circumference) of the stop ring 110 and of the flange 105. In the particular implementation shown, the stop ring 110 has two directly opposite tabs 150, centered 180 degrees apart.

The length of the recessed region 140, between the first edge 142 and the second edge 144, is greater than the length of the tab 150, between the first edge 152 and the second edge 154. In other words, a recessed region 140 has an arcuate length less than 360 degrees and the corresponding tab 150 has an arcuate length less than that of the recess to fit inside the recess and is greater than 0 degrees. With such dimensions, one recessed region 140 receives one tab 150 therein and includes sufficient clearance to allow for circumferential movement of the tab 150 within the recessed region 140; that is, the shape and size of the recess 140 and the tab 150 allow free yet limited travel of the tab 150 within the recessed region 140. The shape and size of the recess 140 and the tab 150 can be adjusted to affect (tune) the operation of the tuning device 100.

In this figure of power flow, the stop ring 110 rotates counterclockwise, so that the first edge 152 of the tab 150 is in contact with the first edge 142 of the recessed region 140, and the second edge 154 of the tab 150 is spaced from the second edge 144 of the recessed region 140. This allows the MGU rotor, through the shaft 104, to be driven by the pulley structure 102 and the belt from the engine. In this power flow, the engine is driving the pulley structure 102 and therefor the MGU.

In FIG. 3B, the opposite is shown, where power (transmitted via torque) passes from the MGU rotor via shaft 104 to the stop ring 110 and through the spring 106 to the pulley structure 102 that is fixed to the spring 106.

In this figure of power flow, the flange 105 of the shaft 104 rotates counterclockwise, so that the second edge 154 of the tab 150 is in contact with the second edge 144 of the recessed region 140, and the first edge 152 of the tab 150 is spaced from the first edge 142 of the recessed region 140. This allows the MGU rotor, through the shaft 104, to drive the pulley structure 102 and thus the belt to the engine. In this power flow, the MGU is driving the engine.

Figure 4A:
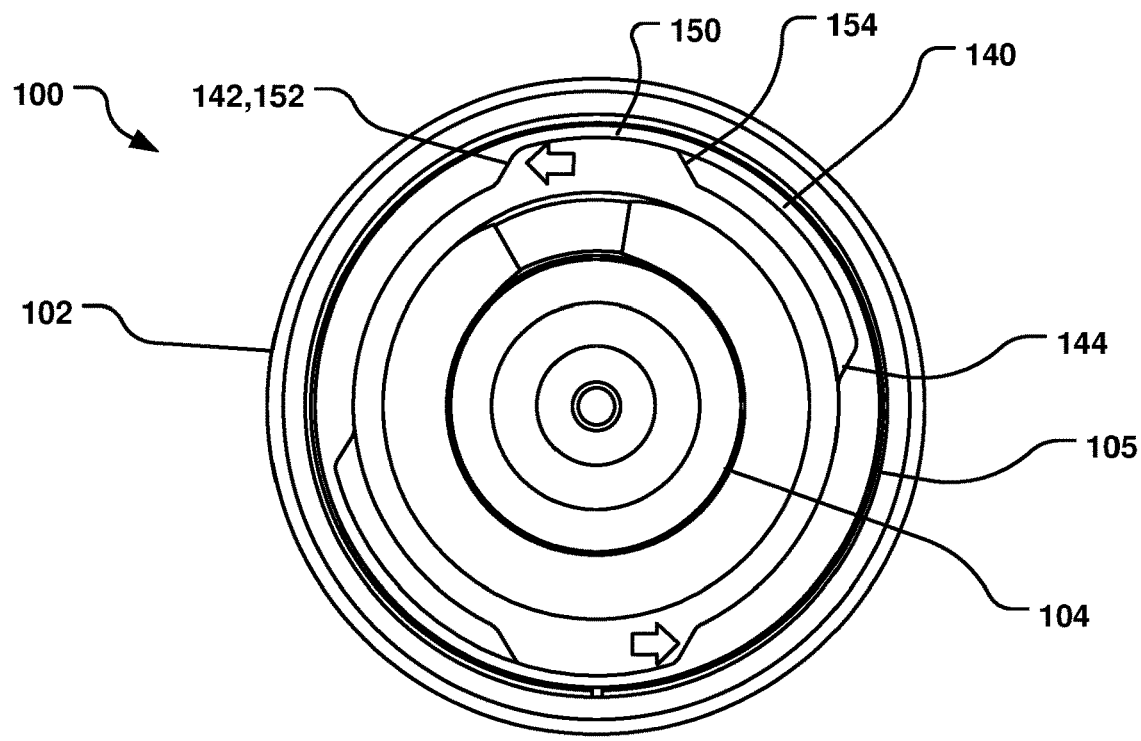
FIG. 4A is a cross-sectional end view of the tuning device of FIG. 1 during power generation.
Figure 4B:
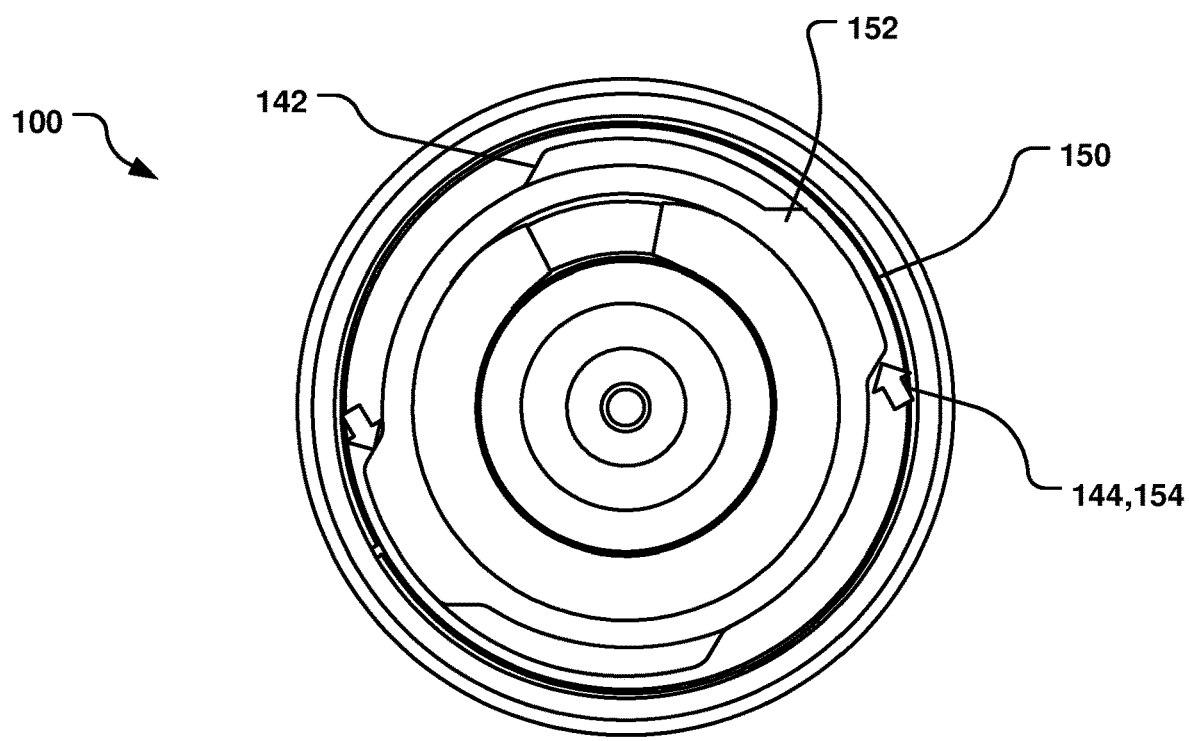
FIG. 4B is a cross-sectional end view of the tuning device of FIG. 1 during motoring (as a driver).

FIGS. 4A and 4B show, in another view, how the elements of the tuning device 100 engage to obtain the two paths of power flow through the tuning device 100, as a driver of the MGU and as a driver of the engine.

In FIG. 4A, as in FIG. 3A, the stop ring 110 drives the shaft 104. The stop ring 110 rotates counterclockwise, so that the first edge 152 of the tab 150 is in contact with the first edge 142 of the recessed region 140, and the second edge 154 of the tab 150 is spaced from the second edge 144 of the recessed region 140. This allows the MGU rotor, through the shaft 104, to be driven by the pulley structure 102 and the belt from the engine. In this power flow, the function of the engine is to drive the MGU.

In FIG. 4B, as in FIG. 3B, the opposite is shown, where the shaft 104 drives the stop ring 110. The stop ring 110 rotates relatively clockwise, so that the second edge 154 of the tab 150 is in contact with the second edge 144 of the recessed region 140, and the first edge 152 of the tab 150 is spaced from the first edge 142 of the recessed region 140. This allows the MGU rotor, through the shaft 104, to drive the pulley structure 102 and thus the belt to the engine. In this power flow, the function of the MGU is to drive the pulley and hence the engine.

Figure 5:
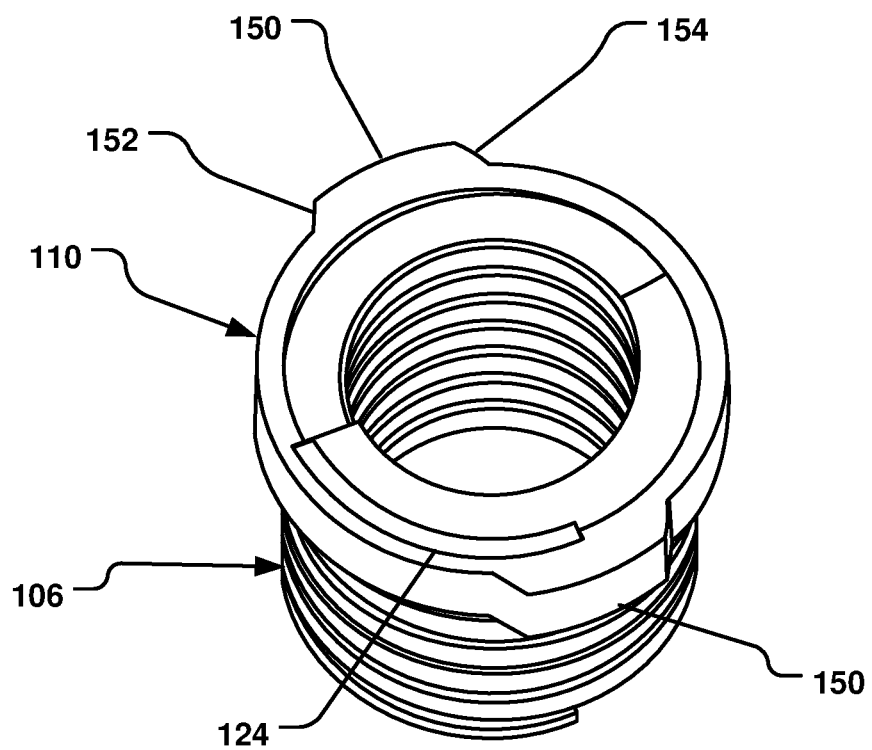
FIG. 5 is perspective view of a spring and spring stop ring of the tuning device of FIG. 1.

FIG. 5 shows the spring stop ring 110 and its engagement with the torsion spring 106. As readily seen, the tabs 150 on the ring 110 have the first edge 152 and the second edge 154. FIG. 5 also shows the third weld 124 connecting the spring 106 to the stop ring 110.

The ability to have both the pulley structure 102 advance ahead of the MGU rotor during generation and the MGU rotor advance ahead of pulley structure 102 during motoring provides isolation to attenuate vibrations during both motoring and generation functions. Additionally, the decoupling of the rotor from the pulley structure further attenuates the vibrations.

In another implementation, the tuning device can include a stop ring that is a damping member attached to the torsion spring (e.g., the spring 106), the damping member between the shaft flange (e.g., the shaft flange 150) and the torsion spring. The damping member may include a damping fluid, such as fluid grease or oil, e.g., against the shaft flange or pulley pocket area which is attached to the pulley or to the shaft. A suitable example of an oil is Mobil® SHC 626 from ExxonMobil Corporation, and a suitable example of a grease is PS0711-0408 from Royal Purple®. The damping fluid may fluidly communicate with the internal volume of the pulley structure, which is separated by the stop ring. The pulley internal volume acts as a reservoir for the damping fluid. The damping member may have tabs extending outwardly which are received in a pulley or shaft pocket.

As an example, such a tuning device would have a shaft, a pulley optionally journaled to the shaft, a spring retainer, a torsion spring, and a damping member (stop ring) attached to the torsion spring, the damping member compressing a damping fluid against the shaft flange or pulley pocket area.

By changing the dimensional characteristics of the tabbed ring or damping member that engages with the MGU rotor (e.g., changing the tab lengths, angle of tab edges), the damping behavior of the tuning device is adjustable, or tunable. For example, the damping effect can be more, less, or the same or different in the two operational directions (e.g., clockwise and counterclockwise).

The various components, elements or parts of the tuning device 100 and other implementations may be formed of any suitable material, including metal (e.g., iron, steel), composite materials (e.g., ceramics), polymeric materials, and any combination thereof. Any of the components, elements or parts may have a coating thereon to, e.g., decrease surface friction, increase durability and decrease physical wear, increase chemical resistance, etc.

The tuning device 100 and other implementations thereof are typically attached to an MGU rotor, which is an accessory of a vehicle engine.

If the engine is at rest and about to be started via the engine crankshaft, the pulley structure 102 will rotate uncoupled to the MGU shaft until the recesses 140 in the shaft 104 engage the tabs 150 on the stop ring 110. This in turn transmits a load into the spring 106 via the second weld 122. The spring 106 then transmits the load into the shaft 104 via the third weld 124, which then transmits the load to the shaft 104, causing it to rotate about the axis R. The spring 106 transmits the load and also isolates angular and torsional vibrations introduced into the system, due to piston firings while the engine is running.

If the engine is started via the MGU, the MGU rotor shaft rotates and transmits torque to the shaft 104, which then transmits torque to the spring 106 through the third weld 124. The spring 106 then transmits torque to the spring retainer 108 via the second weld 122. The stop ring 110 rotates through the recesses 140 until the second edge 154 of the tab 150 hits the second edge 144 on the shaft 104. Torque is transmitted through the spring retainer 108 into the pulley structure 102, which drives the belt, turns the crankshaft, and starts the engine.

The stop ring 110 with the tabs 150 not only works as a bidirectional clutch, but it also functions as a coupler. Between piston firings, the belt slows down, which in turn slows down the accessory pulleys. For pulleys rigidly connected to an accessory shaft, the shaft slows down as well. However, in the designs described here, if the pulley slows down relative to the shaft, the tabs 150 will disengaged from the edges of the recesses, allowing decoupling. This decoupling serves to reduce speed fluctuations in the MGU rotor, allowing the MGU to more effectively charge the battery when in generation mode as well as reducing the effects of torsional vibrations on the MGU.

When the edges 142, 144 of the recess 140 are contacted by the tabs 150 and torque is transmitted one way or another (pulley to shaft, or shaft to pulley) and the torque on one component is greater than the other (e.g., the shaft torque is greater than the pulley torque, or vice versa), the torsion spring 106 is loaded to absorb and isolate the additional torque rather than transmit the variation into the accessory system.

The use of welds 122, 124 to connect the ends of the spring 106 to the load bearing/transmitting components (spring retainer 108, and stop ring 110, respectively) permits loading of the spring 106 in either direction, winding or unwinding. This bidirectional loading capacity allows isolation effects in both directions.

The above specification and examples provide a complete description of the structure and use of exemplary implementations of the invention. The above description provides specific implementations. It is to be understood that other implementations are contemplated and may be made without departing from the scope or spirit of the present disclosure. For example, the flange of the shaft may have more than two recessed area and the stop ring may have more than two tabs; as another example, there may be more recessed areas than there are tabs. Elements of one implementation may be mixed and matched with elements from another implementation unless to the contrary. The above detailed description, therefore, is not to be taken in a limiting sense. While the present disclosure is not so limited, an appreciation of various aspects of the disclosure will be gained through a discussion of the examples provided.

The tuning devices described herein and variations thereof may be incorporated into a broad range of belt drive systems and other systems, including ABDS (accessory belt drive systems), SBDS (synchronous belt drive system), BSG (belt starter generator, e.g., for hybrid vehicles), dual arm tensioners, CVT (continuously variable transmissions), serpentine belts, water pumps, timing, etc. The tuning devices can be used with v-belts, micro-v belts, double v belts, flat belts, round belts, etc., that may be made from rubber or polymer (e.g., polyurethane) and may be reinforced.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A tuning device comprising:
   a pulley structure for receiving a belt on an external surface;
   a torsion spring positioned internal to the pulley structure, with a first end of the torsion spring fixed to a spring retainer fixed to the pulley structure and a second end of the torsion spring fixed to a spring stop ring;
   a shaft extending internal to the torsion spring, the shaft having a flange with at least one recess having an arcuate length; and
   the spring stop ring having at least one outwardly extending tab configured to fit within the at least one recess in the flange, the tab having an arcuate length less than the arcuate length of the recess,
   wherein the pulley structure, the torsion spring and the shaft have a common rotational axis.

2. The tuning device of claim 1, wherein:
   the flange has two recesses each having the arcuate length; and
   the spring stop ring has two outwardly extending tabs each having the arcuate length less than the arcuate length of the recesses.

3. The tuning device of claim 1, wherein the at least one recess has an arcuate length of 90-100 degrees and the at least one tab has an arcuate length of about 45 degrees.

4. The tuning device of claim 1, wherein the first end of the torsion spring is welded to the spring retainer, the second end of the torsion spring is welded to the spring stop ring, and the spring retainer is welded to the pulley structure.

5. The tuning device of claim 1, wherein the spring stop ring and the at least one tab are configured to rotate in relation to the flange of the shaft and the at least one recess.

6. The tuning device of claim 5, wherein the spring stop ring and the at least one tab are configured to rotate clockwise in relation to the flange of the shaft and the at least one recess.

7. The tuning device of claim 5, wherein the spring stop ring and the at least one tab are configured to rotate counterclockwise in relation to the flange of the shaft and the at least one recess.

8. A tuning device comprising:
   a first end of a torsion spring fixed to a pulley structure for receiving a belt on an external surface, and a second end of the torsion spring fixed to a spring stop ring;
   the spring stop ring having at least one outwardly extending tab configured to fit within a recess defined by a first edge and a second edge in a flange of a shaft, the tab configured to repeatedly slide in the recess from the first edge to the second edge and from the second edge to the first edge;
   wherein the pulley structure, the torsion spring and the shaft have a common rotational axis.

9. The tuning device of claim 8, wherein the torsion spring is fixed to the pulley structure via a spring retainer.

10. The tuning device of claim 9, wherein the torsion spring is fixed to the spring retainer and the pulley structure is fixed to the spring retainer.

11. The tuning device of claim 10, wherein the torsion spring is welded to the spring retainer and the pulley structure is welded to the spring retainer.

12. The tuning device of claim 8 wherein the second end of the torsion spring welded to the spring stop ring.

13. The tuning device of claim 8, wherein the tab is configured to repeatedly rotate about the rotational axis in the recess from the first edge to the second edge and from the second edge to the first edge.

14. The tuning device of claim 13, wherein the tab is configured to repeatedly rotate clockwise and counterclockwise about the rotational axis.

15. A tuning device for an MGU belt system, the tuning device comprising:
- a pulley structure for receiving a belt on an external surface, the pulley structure fixed to a torsion spring at a first end of the torsion spring and with a second end of the torsion spring fixed to a spring stop ring;
- a shaft having at least one recess having an arcuate length defined by a first edge and a second edge; and
- the spring stop ring having at least one outwardly extending tab configured to fit within the at least one recess in the shaft, the tab having an arcuate length less than the arcuate length of the recess and configured to repeatedly slide in the recess in a first direction from the first edge to the second edge and in a second direction from the second edge to the first edge;
- wherein the pulley structure, the torsion spring and the shaft have a common rotational axis.

16. The tuning device of claim 15, wherein the torsion spring is fixed to the pulley structure via a spring retainer.

17. The tuning device of claim 16, wherein the torsion spring is fixed to the spring retainer and the pulley structure is fixed to the spring retainer.

18. The tuning device of claim 15, where the shaft is configured for attachment to a rotor of a motor generator unit (MGU).

* * * * *